United States Patent
Piggott

(10) Patent No.: US 6,810,392 B1
(45) Date of Patent: Oct. 26, 2004

(54) METHOD AND APPARATUS FOR ESTIMATING COMPUTER SOFTWARE DEVELOPMENT EFFORT

(75) Inventor: Bryan Norman Piggott, Gambrills, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 942 days.

(21) Appl. No.: 09/126,817

(22) Filed: Jul. 31, 1998

(51) Int. Cl.[7] .............................................. G06N 5/00
(52) U.S. Cl. ............................................. 706/12; 704/8
(58) Field of Search ................................... 704/4, 8, 9

(56) References Cited

U.S. PATENT DOCUMENTS

| | | | | |
|---|---|---|---|---|
| 4,914,590 A | * | 4/1990 | Loatman et al. | 704/8 |
| 5,721,938 A | * | 2/1998 | Stuckey | 704/4 |
| 5,752,052 A | * | 5/1998 | Richardson et al. | 704/9 |

OTHER PUBLICATIONS

"Function Point Analysis Training" Q/P Management Group, Inc., Oct. 19, 1994.*

"Function Point Analysis Training", Q/P Management Group, Certified Function Point Training Course for Release No. 4 Dot Series of the Counting Practices Manual, Oct. 19, 1994, pp. 1–254.

"PAKTUS", User's Guide, PRC Inc., Parts 1–6, June 1993, pp. 1–246.

"Guidelines to Software Measurement" The International Function Point Users Group (IFPUG), Release 1.0, Aug. 1994.

Function Points as Assests Reporting to Management, The International Function Point Users Group (IFPUG), 1992, pp. 1–68.

"IFPUG Glossary", The International Function Point Users Group, Release 2.0, Aug. 1994, pp. 1–7.

* cited by examiner

Primary Examiner—Wilbert L. Starks, Jr.
(74) Attorney, Agent, or Firm—Lowe Hauptman Gilman & Berner, LLP

(57) ABSTRACT

The use of a natural language engine to locate software functionality in a free text document such as a requirements document is disclosed. An electronic version of a free text document is created. A natural language engine is trained to locate function points. The natural language engine performs an analysis of the electronic version of the free text document to locate function points in the electronic version of the free text document. Advantageously, the natural language engine eliminates human subjectivity from the identification of and counting of function points. Other types of functional counting methodologies can also be used in the present invention such as feature points.

17 Claims, 4 Drawing Sheets

METHOD AND APPARATUS FOR ESTIMATING COMPUTER SOFTWARE DEVELOPMENT EFFORT

FIELD OF THE INVENTION

The present invention relates generally to a method for estimating the amount of effort required to develop computer software, and more particularly, to a method and apparatus for analyzing text statements of requirements, using a natural language engine, to estimate the amount of effort required to develop computer software.

BACKGROUND OF THE INVENTION

A requirements document is a free text document which describes functionality requirements for a software development program. Examples of requirements documents include a Request for Proposal (RFP), Statement of Work (SOW), a Statement of Objectives, a Statement of Concept, or a Statement of Requirements. Estimating the amount of effort required to develop software from a requirements document is currently a human intensive activity and is inherently subjective. Even experienced programmers often have to guess, leading to inaccurate estimates.

One measurement of software complexity and cost is lines of source code. Often programmers will provide an estimate in terms of the number of lines of source code required to provide the requested functionality. As can be appreciated, the number of lines of source code to provide the requested functionality is usually a guess. This is because the number of lines of source code over simplifies the degree of complexity for developing source code to meet the functionality requested in a requirements document. One piece of code which has a small number of line of code may require as much effort to develop as another piece of code having significantly more lines of code. Compounding the problem is the way lines of source code are measured. Two programmers looking at already developed source code will frequently differ as to how many lines of source code are required to provide the requested functionality. For example, some programmers count blank lines and other programmers do not. Thus, software development programs relying on a bare estimate of lines of source code are too often over budget and late.

To overcome the guesswork of estimating the lines of source code, function points were developed. Function points use a standard body of rules and judgment of an experienced programmer to provide an estimate of the amount of effort to develop computer software. Function points measure software by quantifying the functionality provided to the customer based primarily on logical design, independent of the technologies used for implementation. Function points can be used to measure the functionality requested by a customer (requirements document) and the functionality received. A requirements document is evaluated to determine the number of function points required to meet the functionality requested in the requirements document. Although there are rules promulgated by the International Function Point Users Group (IFPUG) the application of these rules requires interpretation. Although better estimates can be provided as compared to simply estimating the number of lines of source code, the use of function points is still subjective and subject to human judgment. Thus, two programmers evaluating a requirements document using function points will still have two different estimates for developing source code to meet a requirements document.

Function points provide a mechanism that both software developers and users could utilize to define functional requirements. It was determined that the best way to gain an understanding of the needs of users was to approach their problem from the perspective of how they view the results an automated system produces. Therefore, one of the primary goals of Function Point Analysis is to evaluate the capabilities of a system from the point of view of a user. To achieve this goal, the analysis is based upon the various ways users interact with computerized systems. From the perspective of a user, a system assists the user by providing five (5) basic functions. These functions are depicted in FIG. 1. Two of these functions address the data requirements of an end user and are referred to as Data Functions. The remaining three functions address the need of a user to access data and are referred to as Transactional Functions.

The Five Components of Function Points
  a) Data Functions
    1) Internal Logical Files
    2) External Interface Files
  b) Transactional Functions
    1) External Inputs
    2) External Outputs
    3) External Inquiries Internal Logical Files The first data function allows users to utilize data the user is responsible for maintaining. For example, a pilot may enter navigational data through a display in the cockpit prior to departure. The data is stored in a file for use and can be modified during the mission. Therefore the pilot is responsible for maintaining the file that contains the navigational information. Logical groupings of data in a system, maintained by an end user, are referred to as Internal Logical Files (ILF).

External Interface Files

The second data function is also related to logical groupings of data. In this case the user is not responsible for maintaining the data. The data resides in another system and is maintained by another user or system. The user of the system being counted requires this data for reference purposes only. For example, it may be necessary for a pilot to reference position data from a satellite or ground-based facility during flight. The pilot does not have the responsibility for updating data at these sites but must reference it during the flight. Groupings of data from another system that are used only for reference purposes are defined as External Interface Files (EIF). The remaining functions address the user's capability to access the data contained in ILFs and EIFs. This capability includes inputting, inquiring and outputting of data. These are referred to as Transactional Functions.

External Input

The first Transactional Function allows a user to maintain Internal Logical Files (ILFs) through the ability to add, change and delete the data. For example, a pilot can add, change and delete navigational information prior to and during the mission. In this case the pilot is utilizing a transaction referred to as an External Input (EI). An External Input gives the user the capability to maintain the data in ILF's through adding, changing and deleting its contents.

External Output

The second transactional function gives the user the ability to produce outputs. For example a pilot has the ability to separately display ground speed, true air speed and calibrated air speed. The results displayed are derived using data that is maintained and data that is referenced. In function point terminology the resulting display is called an External Output (EO).

External Inquiries

The third transactional function addresses the requirement to select and display specific data from files. To accomplish this a user inputs selection information that is used to retrieve data that meets the specific criteria. In this situation there is no manipulation of the data. It is a direct retrieval of information contained on the files. For example, if a pilot displays terrain clearance data that was previously set, the resulting output is the direct retrieval of stored information. These transactions are referred to as External Inquiries (EQ).

With this brief discussion of function points in mind, although function point analysis provides an excellent framework for estimating software development time and cost, it is still subject to human subjectivity. Thus, two programmers may differ as to how many function points are contained in a document. A need still exists for a method of estimating the time amount of effort required to develop computer software and a further needs exists for a method of estimating the amount of effort required to develop computer software.

SUMMARY OF THE INVENTION

It is, therefore, an object of the invention to develop a method of using function point analysis which eliminates to a large extent the subjectivity inherent in estimating the amount of effort required to develop software to meet functionality requirements outlined in a free text document.

It is another object of the present invention to develop a method of using function point analysis which eliminates to a large extent the subjectivity inherent in estimating the number of function points or feature points in a piece of source code.

It is yet another object of the present invention to use a natural language engine to determine the number of function points or feature points represented in a free text document.

It is yet a further object of the present invention to use a natural language engine to determine the number of function points or feature points in a piece of source code.

These and other objects of the present invention are achieved by analyzing an electronic version of a free text document. A natural language engine is trained to locate function points. The natural language engine performs an analysis of the electronic version of the free text document to locate function points in the electronic version of the free text document. Advantageously, the natural language engine eliminates human subjectivity from the identification of and counting of function points. Other types of functional counting methodologies can also be used in the present invention such as feature points.

An article, comprising at least one sequence of machine executable instructions; a medium bearing the executable instructions in machine readable form, wherein execution of the instructions by one or more processors causes the one or more processors to: train a natural language engine to recognize and search for phrases in textual documents which are representative of software functionality; analyze the textual document using the trained natural language engine to determine software functionality requirements requested in the textual document.

A computer architecture for analyzing a textual document to determine the amount of effort required to develop software code to meet functionality requirements requested in the textual document, comprising: training means for training a natural language engine to recognize and search for phrases in textual documents which are representative of software functionality; analyzing means for analyzing the textual document using the trained natural language engine to determine software functionality requirements requested in the textual document.

A computer system comprising: a processor; and a memory coupled to said processor, the memory having stored therein sequences of instructions, which, when executed by said processor, cause said processor to perform the steps of: training a natural language engine to recognize and search for phrases in textual documents which are representative of software functionality; analyzing the textual document using the trained natural language engine to determine software functionality requirements requested in the textual document.

Still other objects and advantages of the present invention will become readily apparent to those skilled in the art from following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

A method and apparatus for estimating the amount of effort required to develop computer software according to the present invention are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Hardware Overview

Figure 1:
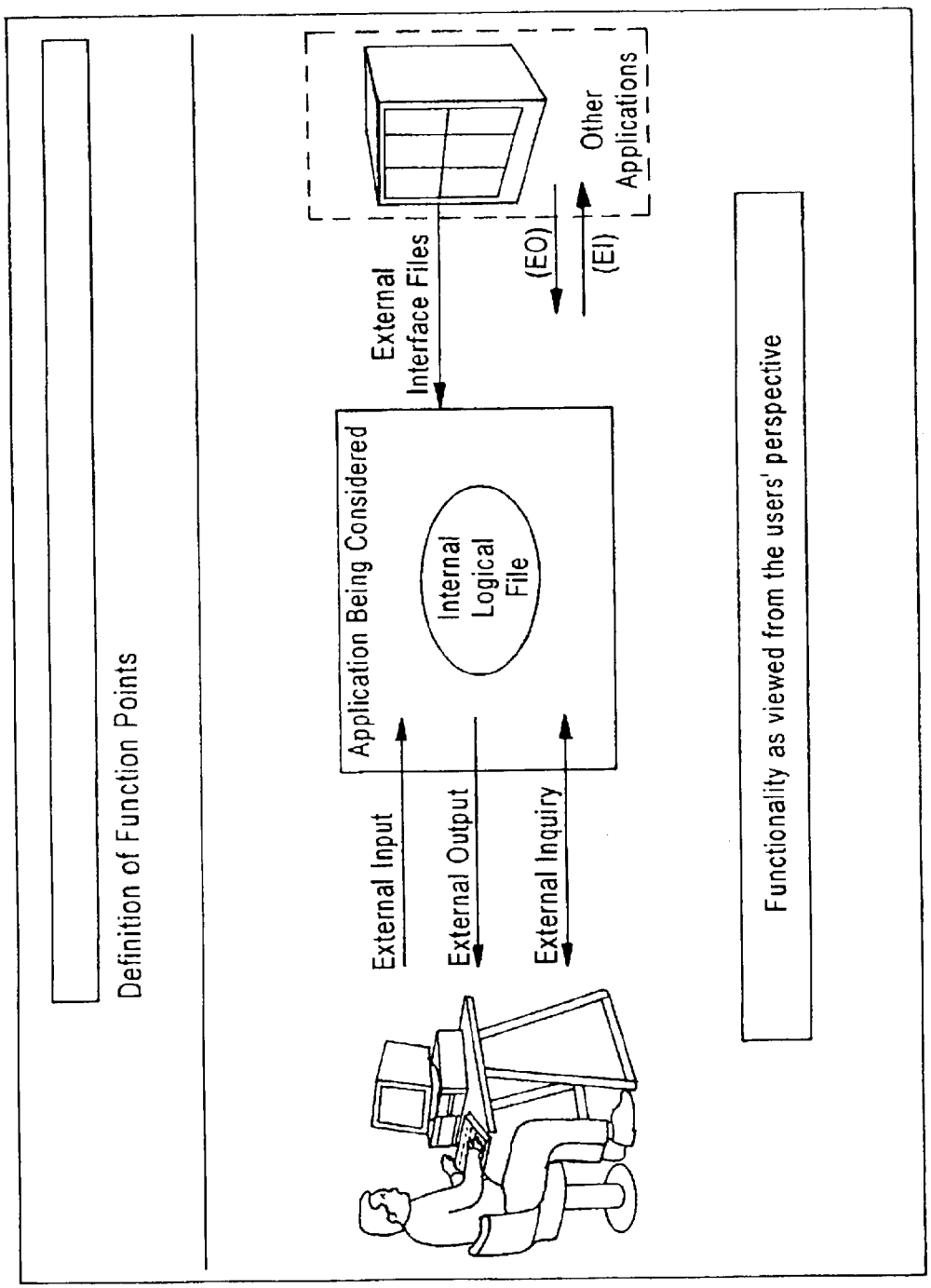
FIG. 1 is a block diagram illustration depicting the components of function points.
Figure 2:
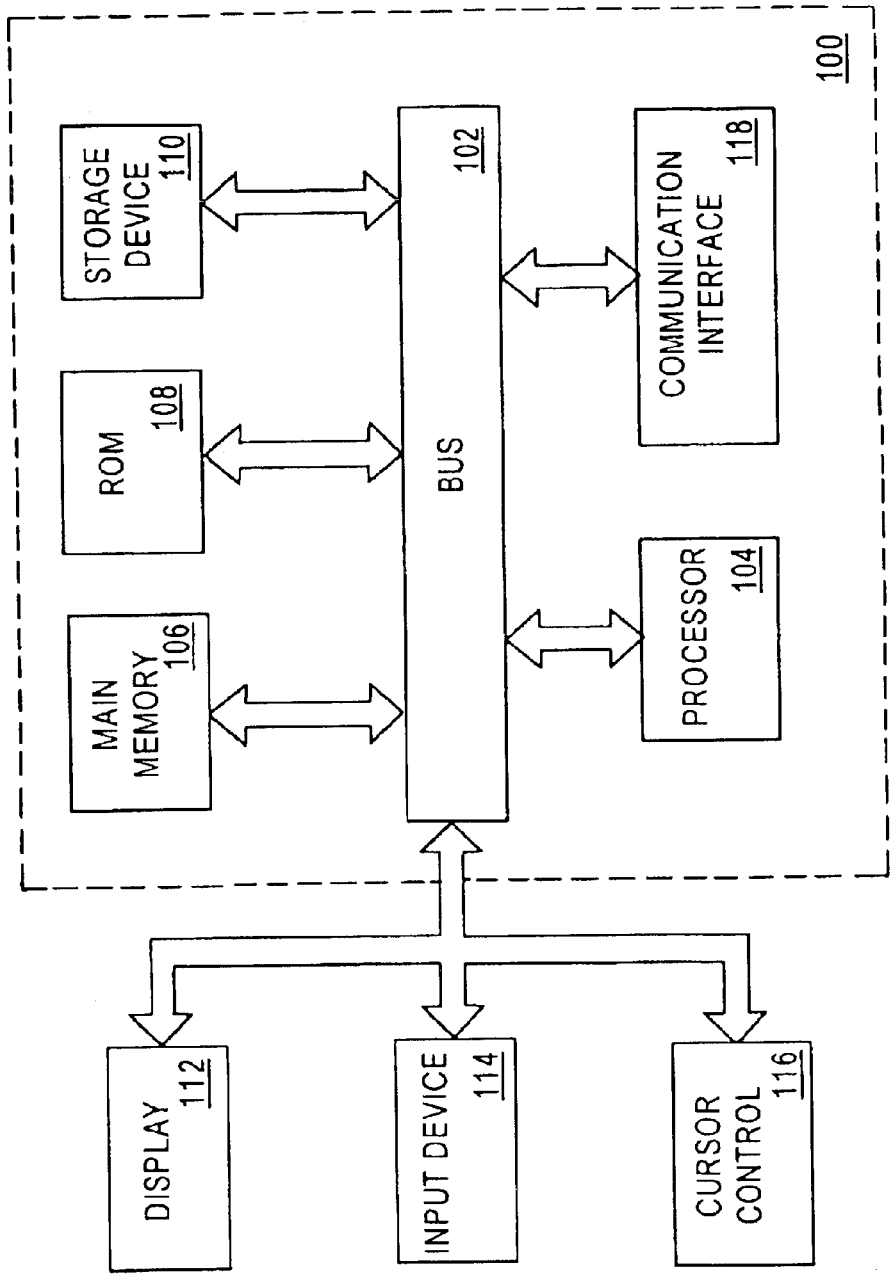
FIG. 2 is a high-level block diagram of a computer system usable with the present invention.

FIG. 1 is a block diagram illustrating an exemplary computer system 100 upon which an embodiment of the invention can be used. The present invention is usable with currently available personal computers, mini-mainframes and the like.

Computer system 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions.

Computer system 100 may be coupled via the bus 102 to a display 112, such as a cathode ray tube (CRT) or a flat panel display, for displaying information to a computer user. An input device 114, including alphanumeric and other keys, is coupled to the bus 102 for communicating information and command selections to the processor 104. Another type of user input device is cursor control 116, such as a mouse, a trackball, or cursor direction keys for communicating direction information and command selections to processor 104 and for controlling cursor movement on the display 112. This input device typically has two degrees of freedom in two axes, a first axis (e.g., x) and a second axis (e.g., y) allowing the device to specify positions in a plane.

The invention is related to the use of a computer system 100, such as the illustrated system, to estimate the amount of effort required to develop software based upon requirements in a free text document. According to one embodiment of the invention, the free text document is analyzed by computer system 100 in response to processor 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 106 causes the processor 104 to perform the process steps described below. In alternative embodiments, hard-wired circuitry may be used in place of or in combination with software instructions to implement the invention. Thus, embodiments of the invention are not limited to any specific combination of hardware circuitry and software.

Computer system 100 also includes a communication interface 118 coupled to the bus 102. Communication interface 108 provides a two-way data communication as is known. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. In the preferred embodiment communication interface 118 is coupled to a virtual blackboard. Wireless links may also be implemented. In any such implementation, communication interface 118 sends and receives electrical, electromagnetic or optical signals which carry digital data streams representing various types of information. Of particular note, the communications through interface 118 may permit transmission receipt of free text documents or source code for analysis or transmission of analyzed free text documents according to the present invention.

Function Points Overview

An overview of function points is provided herein and additional information can be located in the following documents listed below. The present invention uses function points analysis, but does not modify function point analysis but rather uses a natural language engine to remove human subjectivity to function point analysis. Function points were developed in 1979 by Allan J. Albrecht of IBM. Function points are explained in detail in a training guide entitled "Function Point Analysis Training" published by Q/P Management Group, incorporated by reference in its entirety into this specification. There is also an organization called the International Function Point User's Group (IFPUG) that Supports the use of function points and maintains standards of function points. (IFPUG Counting Practices Manual Release 4.0 incorporated herein by reference in its entirety.) Function points measure software by quantifying the functionality provided to the customer based primarily on logical design, independent of the technology used for implementation. Function points can measure the functionality requested by a customer (requirements document) and the functionality received (software). Function points are a measure of software size. Traditionally up to 1979, software size was generally represented in source lines of code. The source lines of code unit of measurement has many problems in estimating how much effort it is going to take to develop or build software. Function points are a measure of sized based on the functionality delivered to the customer.

Definitions

The following definitions are taken from IFPUG glossary release 2.0.

Function: The features or capabilities of an application as seen by the customer/user.

Function point: A metric that describes a unit of product suitable for quantifying application software.

Boundary: The border between the application or project being measured and the external applications or the user domain. A boundary establishes what functions are included in the function point count.

Function type: The five basic information services provided to the user of an application and identified in the function point analysis. The five function types are external input, external output, external inquiry, internal logical file, and external interface file.

External input: One of three transactional function types. An EI processes data or control information that comes from outside the boundary of the application being counted.

External inquiry: One of the three transactional function types. An EQ represents a combination of input (request) and output (retrieval).

External output: One of the three transactional functional types. An EO generates data or control information sent outside the boundary of the application being counted.

Internal logical file (ILF): One of the two data function types. An ILF is a user identifiable group of logically related data or control information maintained within the boundary of the application being counted.

External interface file (EIF): One of the two data function types. An EIF is a user identifiable group of logically related data or control information maintained outside the boundary of the application being counted.

Working Example

Figure 3:
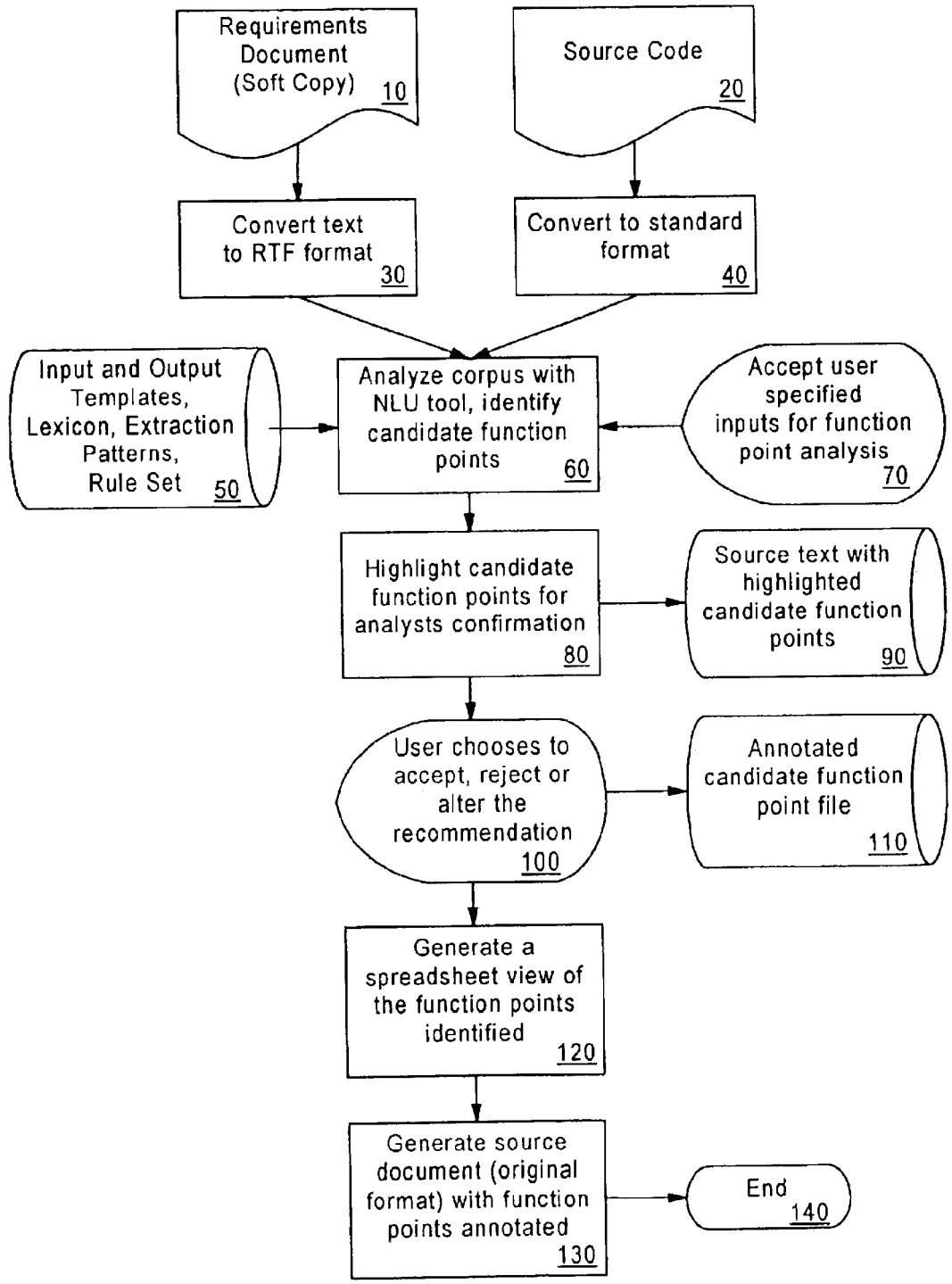
FIG. 3 is a flow diagram of the process according to the present invention.

Turning now specifically to the present invention, in step 10 in FIG. 3, a free text English language text such as a Request for Proposal (RFP) issued by the Government would be electronically input into computer system 100 through, for example, communications interface 118. As used herein, free text means that the words that appear in the text are used as the vocabulary; there is no attempt to use a controlled vocabulary, such as the use of a phrase table. Other examples of English text are a statement of work (SOW), a statement of objectives, a statement of concept, or a statement of requirements that are currently released. An example of such a statement of work for discussion purposes is listed below and is entitled "RESEARCH PLAN STATEMENT OF WORK". Any of these English language texts such as the Statement of Work used herein for discussion purposes is supposed to identify the purpose of the software. Further, the SOW is supposed to identify the operators and the operator actions that are necessary for the software or the system on which the software will run. System as used herein means a combination of the inventive software and the hardware on which the software is used. The SOW would identify in some way the data that is going to be input and the processing performed on the input data. The SOW will provide instructions for storing data, but typically does not require a database format. The SOW will provide requirements for providing data to other users. An example of a Statement of Work used to explain the present invention is provided below. It should be understood that the SOW also includes some highlighting and some identified function points as analyzed and identified by the present invention (and not included in the SOW) which are included for the sake of brevity.

Research Plan—Statement of Work

This statement of work describes the research and development effort to be provided to the US Army Communications and Electronics Command pursuant to the terms of the Cooperative Research and Development Agreement (CRADA) between the Government (USA CECOM) and PRC Inc., a wholly owned subsidiary of Litton Industries, Incorporated. The work tasks to be performed under this SOW are as described below (Tasks 2 through 4). In addition to these tasks, PRC Inc. will perform such preliminary and other necessary Research and Development (Task 1) to support the Government funded tasks the under the cooperative agreement, as described in the PRC Inc. proposal. Task 1 will be funded by PRC Inc. or Litton Data Systems, as appropriate and is included in this statement of work for information purposes only.

The effort identified in this SOW shall be accomplished according to the schedule included with this SOW as Enclosure 1—Schedule. A "proof of principle" demonstration will be performed by PRC Inc. prior to initiation of Task 3 that demonstrates the feasibility of the DSDIW. A development demonstration will be accomplished at the conclusion of Task 3 and a field demonstration will be provided at the conclusion of Task 4. In addition, the contractor will provide a commercialization plan to the Government as part of the final Phase of the project.

Technical Interchange Meetings (TIM) shall be held in accordance with the Cooperative Agreement at least quarterly. The TIM will include a presentation that includes program technical, schedule, and cost status as well as research results and issues.

Task 1: Develop prototype for Dynamic System Defense capability that extends existing intrusion detection functions and define additional requirements for real time tactical military command and control systems by providing (PRC and DSD):

a) Dispatch of dynamically configurable defense agents.

Develop the capability to dispatch configurable agents$^{EO}$ to network processing units. Include the ability to update in-place agents$^{EO,ILF}$ with additional agent software to provide additional information. Develop modular agents to support this functionality.

b) Continuous monitoring of collected data.

Develop the capability to monitor agents on the network. Develop the communication between the agent and the monitor. Store collected data in a database$^{EI, ILF}$.

c) Intrusion detection and automatic response.

Monitor the collect data in the database and analyze for inrtrusions and anomalies.$^{EO}$ Develop the ability to compare the collected data to known thresholds.$^{ILF}$ Develop a rulebase set of countermeasures$^{2ILF}$ for intrusions and anomalies.

d) Configurable countermeasure agents.

Develop configurable countermeasures$^{\#EO}$ to be dispatched as agents. (Provide the user the ability to view a list of the countermeasures$^{IQ}$ available.)

e) Requirements Analysis and Vulnerability Assessment.

Define, assess, analyze and characterize the vulnerability of selected real-time tactical military C2 systems, including computers, communications and applications software, to determine the anticipated intrusion attack profiles of such tactical systems (in addition to the intrusion attack profiles previously considered by PRC in its IW IR&D development of the DSDIW) sufficiently to define the requirements and implementation concepts for Task 2 c).

f) Automated response mechanisms.

Define the automated countermeasure responses$^{\#EO}$ to the intrusion attack profiles for selected tactical military command and control systems (in addition to those responses for intrusion attack profiles for information systems presently being considered by PRC in its IW IR&D development for the DSDIW) sufficiently to define the requirements and implementation concepts for Task 2 e).

Task 2: Customize DSDIW capability for tactical networks to include:

a) Port to tactical internet equipment and customize communication protocol.

Implement DSDIW on hand-held units. In conjunction with the development of first year prototype capabilities, implement the prototype software and demonstrate on Government furnished tactical internet units.

b) Develop smaller, more intelligent agents to limit transmission bandwidth requirements.

Prototype low data rate agent. Build an agent specifically for use in units configured for the tactical internet. Design agents to work with the GFE unit's operating system, tailored for APPLIQUE capabilities. Minimize communication bandwidth requirements between agents and the controller to allow implementation on the tactical internet.

c) Develop attack scenarios for selected tactical C2 systems. Define the signature of the selected attacks compared to normal operations.

Develop duress scenarios for selected situations. Define the signature of a soldier under duress. Determine a mechanism for identifying duress.

Configure DSDIW to identify selected attack and duress situations$^{EO}$ Develop additional software as needed to support selected tactical internet attack and duress scenarios.

d) Extend automated response for selected tactical C2 scenarios.

Prototype countermeasures to attack duress situation detected. Countermeasures includes inaccurate data returned to queries, user lockout, etc.

Develop the capability to detect and broadcast of location of captured/duress unit$^{EO}$. Develop software to identify the location of units when a duress situation was detected. (Present the locations of the captured/duressed units on a current aeronautical chart$^{EIF}$). Determine the method of disseminating the location of the unit to other units.

e) Prototype hierarchical redundancies into reporting structure.

Install agents on mid-tier components of network (HMMWV and trucks) and analyze for misuse. Develop software to provide a redundant data collection points should the first order controller be destroyed captured.

f) Enhanced application audits.

Provide an interface layer between the DPTS agents and selected applications to create audits in support of information protection.

Task 3: Tactical internet integration and test.

a) Software integration lab setup.

Identify, develop and integrate a test/demonstration suite, procedures and tools necessary to execute he demonstration scenarios and generate data in support of the demonstrations of programs Phases 2 and 3.

b) Load, test and provide feedback for the DPS capability.

Load, test and report on the DPTS capability on the tactical internet for demonstrations in Phases 2 and 3 of the program. This does not include demonstrations themselves, but the complete demonstration preparation outside of the demonstration setup of 3. b).

c) CECOM DIL Predemonstration setup and verification testing.

Set up the adapted DPTS in the CECOM DIL and conduct verification testing tin preparation for the final demonstration.

Task 4: Demonstrations and reports (PRC and DSD).

a) Monthly reports and technical interchange meetings.

Prepare monthly R&D status reports for the duration of the program. Conduct technical interchange meetings at the commencement of the program and prior to each of the three demonstrations. Prepare R&D status reports at monthly intervals for the duration of the program.

b) Technical reports.

Prepare a scientific and technical report for the program. In concert with the Government, submit the report in draft form at the conclusion of interim demonstrations and the final version at the completion of the program. In addition, the research team will prepare and submit a commercialization plan to the Government concurrent with submission of the final technical report.

c) Interim demonstrations.

Conduct demonstrations of the DPTS operating on the tactical internet with progressively higher levels of fidelity in contractor facilities.

d) CECOM DIL proof of principle demonstration.

Conduct demonstration of the DPTS operating on the tactical internet

Demonstration is to be conducted at the U.S. Army CECOM DIL.

Returning to FIG. 3, at step 30, the requirements document input at step 10 is converted to a Rich Text Format (RTF format). RTF was designed by Microsoft as an open format for interchanging documents between Microsoft Word and other word processing packages such as WordPerfect, Frame Maker, Interleaf and many other packages on Unix, Apple, Next and PC platforms. Alternatively, source code can be input at step 20 and converted to a standard format at step 40.

At step 50, a natural language understanding (NLU) engine would be conditioned with an input/output template that would describe the five types of function types used in function point analysis. The natural language engine would be conditioned to identify the previously defined components of function points and described in greater detail below.

Internal Logical File

An internal logical file is a user identifiable group of logically related data or control information maintained within the boundary of the application (can be an ILF to more than one application). User identifiable refers to the specific user requirement that an experienced user would define for the application. Control information is data used by the application to ensure compliance with business function requirements specified by the user. The group of data is maintained within the application boundary. Maintained implies the ability to modify data through an elementary process. Maintained is ability to add, change, delete, populate, revise, update, assign and create. An elementary process is the smallest unit of activity that is meaningful to the end user in the business. Examples of the smallest units of activity might include: personnel, inventory, customer data; history and master data; audit data; real-time data registers; stored flight plans.

The following units of activity are not counted: temporary files; work files; sort files and JCL, DCL, etc.

The group of data identified has not been counted as an EIF for the application.

External Interface File

User identifiable group of logically related data or control information referenced by the application, but maintained within the boundary of another application. (EIF counted for an application must be an ILF in another application). User identifiable refers to the specific user requirement that an experienced user would define for the application. Control information is data used by the application to ensure compliance with business function requirements specified by the user. The EIF is maintained by another application. There is no capability for add, change, or delete information contained in an EIF. The EIF is used for reference (not a file of transactions which are External Inputs to another application).

The following text are counted if used but not maintained by the EIF: parameter records, state, rate and message tables, edit criteria, help text, security information and satellite positional data.

Transactional Function Types

External Inputs (EI) reflect the functionality provided the user for the receipt of and maintenance of data in Internal Logical Files.

External Outputs (EO) reflect the functionality provided the user for output generated by the application.

External Inquiries (EQ) reflect the functionality provided the user for queries of Internal Logical Files or External Interface Files.

External Input

External inputs are entered directly from users, as a file of transactions from another application or a signal from another system.

External inputs include unique user data or control information that enters the external boundary of the application. User data is unique if there are different data elements, or if there are different processing logic.

Processing logic is defined as any of the following requirements specifically requested by the user to complete an elementary process: edits, algorithms or calculations, a reference to or use of an ILF or EIF, processed data is maintained in one or more Internal Logical Files. External inputs can be used to modify data through an elementary process (add, change, populate, revise, update, assign and create). The External Input (EI) itself is an elementary process.

External Output

An external output is an elementary process that generates data or control information sent outside the boundary of the application. An external output is unique if different data elements or if there is different processing logic. An external output can be sent directly to users as reports, sent to other applications as files, or sent to other systems as signals.

Examples of external outputs include: reports on different media (if unique processing involved), derived data provided to users, different graphical displays, summary level reports that are separate from detail level reports, and control signals to other systems or controllers. The following information is not counted: error messages, summary fields on a detail report are not counted as a separate EO (Summary fields are counted as DETs to determine complexity).

External Inquiry

An external inquiry is an elementary process made up of an input/output combination that results in data retrieval. An external inquiry is unique if either the input side or output side has different data elements. An external inquiry is unique if different processing logic.

Examples of external inquiries include: full screen help, field help, data retrieval prior to change or delete, logon screens that provide security, different graphical displays (if not derived), drop-down and/or list boxes (when data is retrieved from an ILF or EIF).

The external inquiries not counted include, for example: duplicate help accessed from multiple areas (counted once only), output containing derived data, on-line documentation, and navigational menus.

As is known, the natural language engine understands paragraphs, titles, headings, sub-headings and so the NLU does need to be conditioned to recognize the basic structures of documents. In cases where the natural language engine cannot make a determination whether there is a function point or not the NLU would highlight that location in the document and annotate it. For example, the NLU may find an internal logical file that has no associated input or output, in other words missing information. It is unlikely that the natural language understanding tool could draw an inference and instead would annotate the document.

Eventually, after the source code is developed the actual source code can be evaluated for function points to compare the original estimate against the actual software. In this example, at step 50 the natural language understanding engine would have to be conditioned to understand the structure of the source code to be able to read the source code as the NLU analyze presently free text documents.

One example of an NLU engine is PAKTUS, which is commercially available from PRC Inc., McLean, Virginia. Other NLU understanding engines such as Hower, SOAR and Natural Language Assistant can also be used. A general discussion follows of the "training" necessary for the NLU to be effective. Italicized terms are special terms from the PAKTUS Users Manual which is incorporated by reference in its entirety into this specification. PAKTUS is also described in U.S. Pat. No. 4,914,590 which is also incorporated by reference in its entirety into this specification. The lexicon for the NLU will be augmented to include all words and their "word-sense" (different word meanings) that are critical to function point analysis of software systems. The lexicon is like a dictionary; it contains words and information associated with words. The two basic types of information needed about a word are: how it can be used in a sentence (syntactic information) and what it means (semantic information). PAKTUS has a large lexicon of word roots already developed so it is not anticipated that a significant number of new words will need to be added. The NLU engine includes a linguistic core including morphology. There is a need, however, to augment the "word-sense" of some words. No NLU system can account for all of English, and it is argued that machines may never be able to match a human being in this task. In order to accomplish any useful work with an NLU system, then, each system is built with a specific, limited task in mind. In addition, the linguistic structures and vocabulary that the system can handle are specifically targeted to the application domain and the expected input text format.

PAKTUS provides the basic, or "core" knowledge needed to understand much, or most, of the input text. This core knowledge should not be modified (except by experienced developers), but it can be extended by application-specific knowledge based on the task, domain, and text.

The lexicon of the NLU will be augmented in several ways for analyzing SOWs. In particular, the characteristics of function points will be recorded using A Kind Of (AKO) and KINDSOF slots (more fully described in the PAKTUS Users Manual). Function points represent the inputs, outputs, and data required for a system to provide services to the system users. Terms are characterized as AKO input, AKO output and AKO data. The KINDSOF slot is another view of these same terms that provides lists of terms that are KINDSOF inputs, outputs, or data. The function points are further characterized by associating a concept slot with each of the verbs that could indicate a function point. The following is an example of AKO and concept slots in a requirements statement: produce a report describing the rate at which contributions were received. Data shall be presented by the hour, day, week and month.

The verb produce is assigned a concept slot to indicate an output function point and that there should be an associated data function point. The noun report is characterized as A Kind Of output. The noun data would be characterized as potentially indicating all three classes of function points.

To effectively identify and record function points from text documents, category-specific features are identified. These features are primarily used to hold information that constrains the filling of output templates. This capability will be used by the NLU to distinguish verbs and concepts that could indicate function points but could also indicate something else. The example from above is the verb produce; in this case we are producing a report but we could also produce vegetables, which would not, of course, be a function point.

The concept of roles are examined with respect to function points. A role is a participant normally associated with a word or concept. For example, the verb "give" denotes a transfer that involves a giver, a receiver, and something given. In a normal analysis of a sentence with a form of the verb "give", a template wold be built. Then the three roles would be searched that are assigned a giver, a receiver and the thing given. Roles will similarly have to be assigned to the function point concepts. These roles will be the basis of templates to be filled in the search for function points.

Information extraction patterns will be used which describe how the NLU will identify function points. The information extraction patterns are combined of templates and slots. A template is roughly equivalent to a database record with the slots roughly equivalent to the fields of the data base record. The templates and slots will have formats and criteria associated therewith. These must be defined unambiguously so that the NLU software can perform its task.

An output structure will be used for the extracted information. This output structure will include ancillary and supporting information for the selection of information for a function point. There are two output structures. The first is an internal structure that extracts concepts from the preprocessed sentences and places them in a predetermined format. This structured format is the output of the NLU engine. This output is then processed further to put the information into a format more suitable for subsequent analysis and human viewing. A final output format can be a spreadsheet format or a word process format.

Special grammatical constraints will be addressed for source documents other than free form text. For example, the automated function point counter will be able to examine structured design representations such as EER diagrams or IDEF diagrams to estimate the functionality that will be delivered to a customer. The function point counter will also be able to examine software programs to determine the functionality actually delivered to a customer. The special grammatical needs are to identify to the NLU the syntax, grammar and semantics of the particular design representation-and/or software language used to represent or develop the software to be examined.

Figure 4:
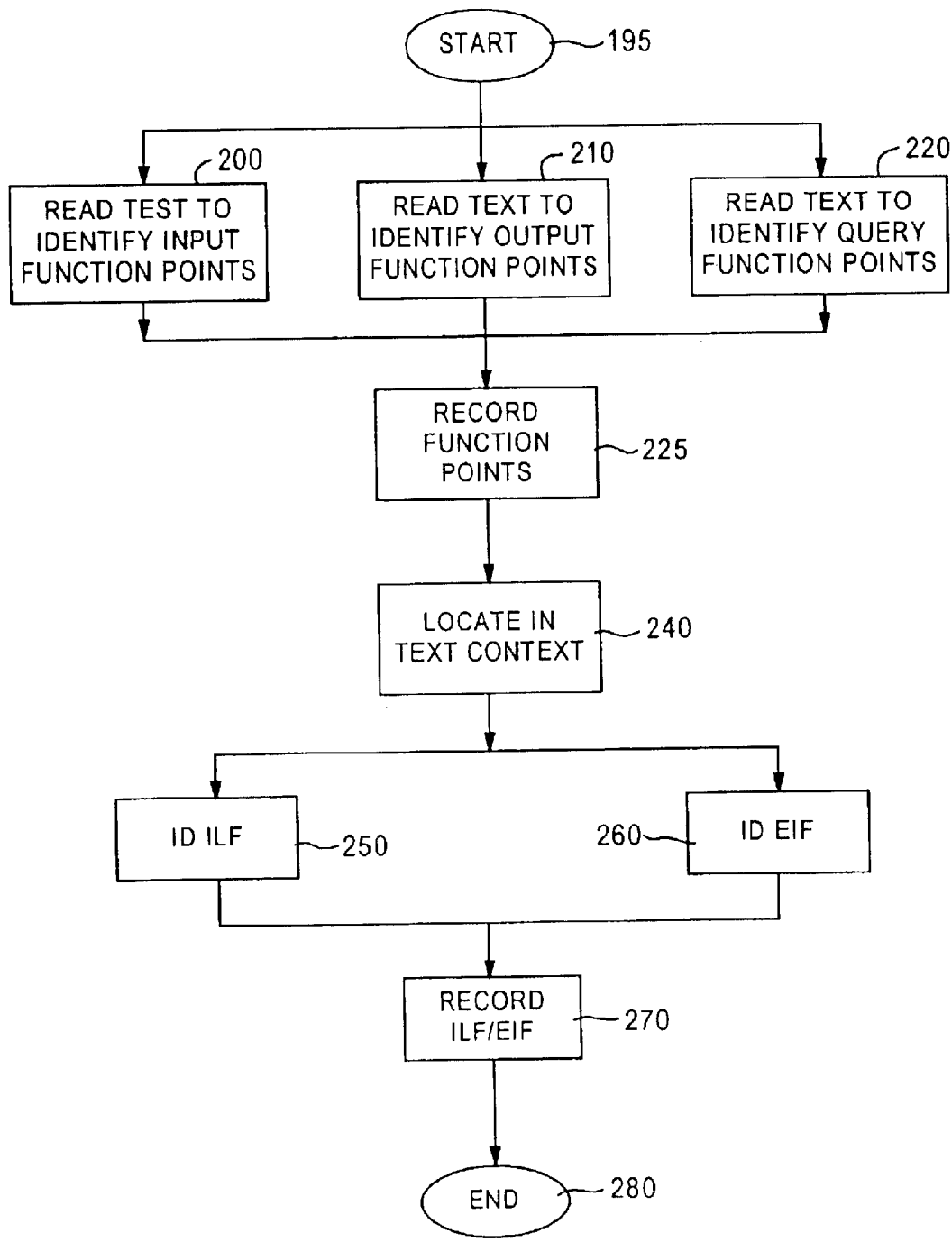
FIG. 4 is a flow diagram of one of the steps of FIG. 3.

At step 60, based on the conditioning provided at step 50, the NLU can identify an input and output and internal logical file and so forth. Step 60 is depicted in greater detail in FIG. 4 and the process starts at step 195. The text is read to identify input function points at step 200. Output function points are read from text at step 210. At step 220, query function points are read from text. The functions are located in text context at step 225 and recorded at step 230. At step 240, the probable ILF/EIF are recorded. In step 240, we examine the EIs, EOs and EQs identified in steps 200, 210 and 220 to predict the ILFs and EIFs that we should find in steps 250 and 260. In step 250, the NLU will identify the ILFs described in the requirement document. In step 260, the NLU will identify the EIFs described in the requirement document. In step 270, we compare the predicted ILFs and EIFs with those found in the requirement document and report the results to the user. At step 280, the process is complete and the process proceeds to step 80.

The document entitled "Research Plan Statement of Work" provided above should be referred to for the discussion below. As previously discussed, the natural language understanding engine already has the ability to understand headings, topics, lists and other structural components of free text documents. Section a of Task 1 is called "dispatch of dynamically configurable defense agents." One sentence says "dispatch configurable agents" and has been marked as an EO implying that there is an external output because the NLU would determine that the dispatch is an external output. The NLU will infer that the subject of this sentence is the system to be built. Once the NLU determines that the subject is appropriate, the sentence will be examined to locate verbs and verb phrases that imply transactional function points, in this case, dispatch. Dispatch implies the transmission of something, the object of the verb, configurable agents, is an EO. The subsequent sentence has an implied subject of the system with the verb update. The verb update implies changing information in a data structure; the in-place agents are a type of data structure (an ILF) that are to be updated and the update itself requires an EO. The next sentence says "update in-place agents" and has been marked EO or an external output and ILF or an internal logical file because the NLU would determine that there is an ILF of in-place agents. Section b has a sentence which includes "store collected data in a database" and is marked as EI, ILF because the data is an external input and because an internal logical file should be created. The NLU will infer that the subject of this sentence is the system to be built. Once the NLU determines that the subject is appropriate, the sentence will be examined to locate verbs and verb phrases that imply transactional function points, in this case, store. Store implies permanent recording of something (an ILF) the object of the verb, collected data, an EI. Section c has a sentence which says "analyze for intrusions and anomalies" and is marked as an EO. The NLU will infer that the subject of this sentence is the system to be built. Once the NLU determines that the subject is appropriate the sentence will be examined to locate verbs and verb phrases that imply transactional function points, in this case, monitor and analyze. The system is monitoring and analyzing the collected data, an EI from the previous analysis. The NLU will conclude that the product of the monitoring and analyzing is done for a system purpose and should be either provided as an output (EO) or stored as data (ILF). The system will default to an EO in the absence of specific direction and determine in a later step if there is a necessity to permanently store the information. The sentence that says "compare the collected data to known thresholds" is marked as an ILF. The NLU will infer that known thresholds represent a table of values that must be available for comparison, an ILF. The sentence which includes develop a rule-based set of countermeasures" is marked as 2 ILF. Section d is called "Configurable Countermeasure Agents. In Section. d, one sentence says "develop configurable countermeasure to be dispatched as agents" which is marked as EO. Another sentence says "develop configurable countermeasures" which is marked as an external output. The next sentence includes the phrase "view a list of countermeasures" which is marked as IQ.

The next section is called "Requirement Analysis and Vulnerability Assessments." There is a phrase in the paragraph that says to "determine the anticipated intrusion attack profiles." To meet the requirements of this requirements document, there would be software developed that has to be able to anticipate intrusion attack profiles, but the word attack profiles implies that there is information that has to be stored and retrieved cause that is the purpose of a profile. There would be an internal logical file and an external output because any time information is stored in the system, there is going to be output.

Section f is called "Automated Response mechanism", is of interest here to define the automated countermeasure. This is an instance of a requirement that is too general. The natural language understanding engine may also be able to tell that so there should be some number of outputs associated with this automated countermeasure. The count of them is unclear because there needs to be more detail. Define automated counter measure responses clearly identifies EOs, but the number of EOs is unclear because later in the sentence it says for selected tactical military command and control systems and the selected systems are not identified or counted. There is also going to be some number of associated internal logical files because these countermeasures need to be stored in an area that they can be selected and retrieved and dispatched as agents from the previous sentences. This is an example of the process that will be highlighted for step 80 for a human to go through in order to identify function points.

Task 2, Section c includes the phrase "identify selected attack and duress situations" which is marked as an EO. Section d has a phrase "broadcast of location of captured/duressed units" marked as an EO. Another phrase "present ... on a current aeronautical chart" which is marked as an EIF which is external to the system. This file would not be maintained as part of the functionality of the software but would be accessed by the software.

At step 90, the source text would be highlighted as depicted above. At step 100, the user chooses to accept, reject or alter the highlighted text and at step 110 an annotated candidate function point file is created. At step 120, a spreadsheet view of the function formats identified is created as provided below in Table 1. At step 130, a source document is generated with function points annotated. At step 140, the process is complete.

TABLE 1

| Function Point | EI | EO | ILF | EIF | IQ |
|---|---|---|---|---|---|
| Dispach Configurable Agents | | X | | | |
| Update In-Place Agents | | X | X | | |
| Store Collected Data in a Database | X | | X | | |
| Analyze for Intrusions and Anomalies | | X | | | |
| Compare Collected Data to Known Thresholds | | | X | | |
| Rule-Based Set of Countermeasures | | | X | | |
| Configurable Countermeasures | | X | | | |
| View a List of Countermeasures | | | | | X |
| Identify Selected Attack and Duress Situations | | X | | | |
| Broadcast of Location of Captured/Duressed Units Present??? | | X | | | |
| On a Current Aeronautical Chart | | | | X | |

EI = External Inputs
EO = External Outputs
ILF = Internal Logical File
EIF = External Logical Interface
IQ = Inquiry Metric Formula:

Unadjusted Function Points=(External Inputs*Weight)+(External Outputs*Weight)+(Logical Internal Files*Weight)+(Logical Interfaces*Weight)+(Inquiries*Weight)

The previously identified function points then would be input the metric formula to determine an unadjusted function point. The unadjusted function point would then be adjusted based upon a value adjustment factor. A GUI interface would be used to ask the necessary questions to determine the value adjustment factor (VAF). The application of the VAF is simple multiplication. Step 70 is the step where the VAF data would be obtained and to make adjustments to the NLU engine for unknown words.

| Adjusted Function Points | Unadjusted Function Points * Value Adjustment Factor |
|---|---|

The amount of effort required to develop the software to provide the functionality required by the requirements document could then be readily determined using function point analysis.

Advantageously, the present invention eliminates, to a large degree, human subjectivity in locating function points thus providing consistency in estimating the amount of effort required to develop software based on a free text document. This estimate can be compared against actual source code developed to meet the requirements document to determine the number of function points in the source document. The templates used to condition the natural language engine can then be adjusted to make more accurate determinations on subsequent requirements documents. Other methods of determining software functionality such as feature points can also be advantageously used in the present invention.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of analyzing a textual document to determine the amount of effort required to develop software code to meet functionality requirements requested in the textual document, comprising:

training a natural language engine to recognize and search for phrases in textual documents which are representative of software functionality;

analyzing the textual document using the trained natural language engine to determine software functionality requirements requested in the textual document.

2. The method of claim 1, wherein the natural language engine is PAKTUS.

3. The method of claim 1, wherein the software functionality requirements are function points.

4. The method of claim 3, comprising labeling portions of the textual document as one of EI, EO, ILF, EIF and IQ.

5. The method of claim 1, comprising identifying function points.

6. The method of claim 4, comprising counting function points.

7. The method of claim 1, wherein the textual document is source code.

8. The method of claim 1, wherein the textual document is free text.

9. The method of claim 8, wherein the textual document is in the English language.

10. The method of claim 7, comprising comparing the text against the actual source code generated to further train the natural language engine.

11. The method of claim 1, comprising providing electronically encoded data representative of the textual document.

12. The method of claim 1, further comprising outputting a table of phrases representing software functionality requirements.

13. The method of claim 1, further comprising highlighting portions of the textual document which include software functionality requirements.

14. The method of claim 4, comprising relating EI, EO, ILF, EIF and IQ to each other and providing information that the relationship between EI, EO, ILF, EIF and IQ is insufficient to define a function point.

15. An article, comprising:

at least one sequence of machine executable instructions;

a medium bearing the executable instructions in machine readable form, which execution of the instructions by one or more processors causes the one or more processors to:

train a natural language engine to recognize and search for phrases in textual documents which are representative of software functionality;

analyze the textual document using the trained natural language engine to determine software functionality requirements requested in the textual document.

16. A computer architecture for analyzing a textual document to determine the amount of effort required to develop software code to meet functionality requirements requested in the textual document, comprising:

training means for training a natural language engine to recognize and search for phrases in textual documents which are representative of software functionality;

analyzing means for analyzing the textual document using the trained natural language engine to determine software functionality requirements requested in the textual document.

17. A computer system comprising:

a processor; and a memory coupled to said processor, the memory having stored therein sequences of instructions, which, when executed by said processor, cause said processor to perform the steps of:

training a natural language engine to recognize and search for phrases in textual documents which are representative of software functionality;

analyzing the textual document using the trained natural language engine to determine software functionality requirements requested in the textual document.

* * * * *